United States Patent
Suzuki

(10) Patent No.: US 8,897,968 B2
(45) Date of Patent: Nov. 25, 2014

(54) ELECTRIC POWER STEERING SYSTEM

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 75 days.

(21) Appl. No.: 13/820,952

(22) PCT Filed: Sep. 6, 2011

(86) PCT No.: PCT/IB2011/002055
§ 371 (c)(1),
(2), (4) Date: Mar. 5, 2013

(87) PCT Pub. No.: WO2012/032393
PCT Pub. Date: Mar. 15, 2012

(65) Prior Publication Data
US 2013/0179040 A1   Jul. 11, 2013

(30) Foreign Application Priority Data
Sep. 7, 2010  (JP) .................................. 2010-200281

(51) Int. Cl.
*B62D 5/04* (2006.01)
*H02P 29/02* (2006.01)
*H02P 21/00* (2006.01)
*H02P 21/06* (2006.01)

(52) U.S. Cl.
CPC ............ *B62D 5/0484* (2013.01); *H02P 29/022* (2013.01); *H02P 21/0021* (2013.01); *B62D 5/0478* (2013.01); *H02P 29/025* (2013.01); *H02P 21/06* (2013.01); *B62D 5/0463* (2013.01); *B62D 5/0403* (2013.01); *B62D 5/0487* (2013.01)
USPC .......................................... 701/43; 180/443

(58) Field of Classification Search
USPC ............................................ 701/43; 180/443
See application file for complete search history.

(56) References Cited

U.S. PATENT DOCUMENTS

2005/0159866 A1* 7/2005 Takeuchi et al. ................. 701/41
2006/0219470 A1 10/2006 Imagawa et al.

FOREIGN PATENT DOCUMENTS

EP   1 512 609 A1   3/2005
EP   1 737 116 A1   12/2006
(Continued)

OTHER PUBLICATIONS

Dec. 21, 2011 International Search Report issued in PCT/IB2011/002055.

(Continued)

*Primary Examiner* — Mary Cheung
*Assistant Examiner* — Yuen Wong
(74) *Attorney, Agent, or Firm* — Oliff PLC

(57) ABSTRACT

In an electric power steering system, a control signal output section outputs independent dual-system control signals to driver circuits that are disposed in connection with independent dual-system motor coils. The control signal output section gives high priority to the output of the control signal to the other system, when the occurrence of energization failure is detected in one system. When the energization failure occurring phase is only one phase and the value of the basic command exceeds the upper limit of the priority command, the control signal output section outputs the control signal to the driver circuit in the system where the energization failure has occurred in order to supply electric power in which the two phases other than the energization failure occurring phase are used as the energized phases on the bases of the complementary command that corresponds to the excess of the upper limit.

8 Claims, 10 Drawing Sheets

(56) References Cited

FOREIGN PATENT DOCUMENTS

| | | |
|---|---|---|
| JP | A-2004-10024 | 1/2004 |
| JP | A-2008-211909 | 9/2008 |
| JP | A-2008-211910 | 9/2008 |
| WO | WO 2005/091488 A1 | 9/2005 |

OTHER PUBLICATIONS

Dec. 21, 2011 Written Opinion issued in PCT/IB2011/002055.

* cited by examiner

ELECTRIC POWER STEERING SYSTEM

The disclosure of Japanese Patent Applications No. 2010-200281 filed Sep. 7, 2010, including the specification, drawings and abstract is incorporated herein by references in its entirety.

BACKGROUND OF THE INVENTION

1. Field of the Invention

The present invention relates to an electric power steering system.

2. Description of the Related Art

In general, an electric power steering system (EPS) has a function of detecting the occurrence of an anomaly of a motor when the energization failure occurs in any of phases of the motor (any of U, V, and W phases) due to a break in a power supply line, a contact failure of a driver circuit, or the like. Examples of the energization failure include the break in a power line that connects between the driver circuit and a motor coil in each phase, and an open fault (permanent open fault) of each switching element that configures the driver circuit. Conventionally, when such the failure is detected, the configuration that stops the motor immediately and provides a fail-safe is commonly employed.

However, the stop of the motor as a drive source results in a certain increase of a steering effort that is required of a driver. Therefore, in recent years, a continuous power assist control is demanded even after the occurrence of the energization failure as described above.

For example, a pamphlet of International Publication No. WO 2005/91488 discloses the configuration that continuously runs the motor, when the energization failure occurs in only one phase, by using two phases other than the energization failure occurring phase, as energized phases. The above configuration is also able to generate uniform motor torque by setting a specified rotation angle corresponding to the energization failure occurring phase as an asymptote and flowing a phase current that varies in a secant curve (a curve based on sec θ=1/cos θ) pattern or a cosecant curve (a curve based on cosec θ=1/sin θ) pattern to each energized phase. Details of the method of performing a two-phase drive control that flows the phase current in the secant curve pattern or the cosecant curve pattern are disclosed in Japanese Patent Application Publication Nos. 2008-211909 (JP-A-2008-211909) and 2008-211910 (JP-A-2008-211910), for example.

In addition, Japanese Patent Application Publication No. 2004-10024 discloses the configuration that includes dual-system motor coils that are provided independently and multiple driver circuits that are capable of independently energizing each of the motor coil systems. When the above configuration is applied to the EPS, even if the energization failure occurs in one system, the continuous power assist control can be achieved through the power supply to the other system.

However, when the two phases other than the energization failure occurring phase are simply used as the energized phases, significantly large torque ripples arise (for example, see FIGS. 9 and 10 of JP-A-2008-211909). Although the uniform motor torque can be generated through two-phase energization in the secant curve pattern or the cosecant curve pattern, the phase current that can actually flow has a limit, and a drop in the motor torque that arises near the asymptote due to the execution of the current limit is unavoidable. Even if the motor coil and the driver circuit as well as a power supply line are configured to be the dual systems, as long as the configuration utilizes the motor torque of both systems, the power drop due to a stop of the energization of one system is unavoidable. As described above, any of the conventional techniques involve the decrease of steering feel in the continuous control after the occurrence of the energization failure, and in this regard, room for improvement remains.

SUMMARY OF THE INVENTION

The present invention is made in view of the problems with the related art described above and provides an electric power steering system that can improve the steering feel in the continuous control after the occurrence of the energization failure.

According to one aspect of the present invention, the present invention provides an electric power steering system that includes: a steering force assist device that gives assist force to a steering system based on magnetomotive force that is generated by dual-system motor coils that are provided independently; and a controller that controls operation of the steering force assist device through electric power supply to the motor coils, in which the controller includes: a command section that generates a basic command for the power supply in order to generate motor torque corresponding to the assist force; a control signal output section that outputs independent dual-system control signals based on the basic command; and independent dual-system driver circuits that output three-phase drive electric power to the motor coils that are connected based on the control signals, characterized by including: a detection section that detects for each phase the occurrence of energization failure in each power supply path of the systems in connection with the motor coils, in which when the occurrence of the energization failure is detected in one system the control signal output section gives high priority to the output of the control signal to another system, and when energization failure occurring phase is only one phase and a value of the basic command exceeds an upper limit that is set to a normal system that gives high priority to the output of the control signal, the control signal output section outputs the control signal to the driver circuits in the system where the energization failure has occurred in order to supply electric power which corresponds to the excess of the upper limit and in which two phases other than the energization failure occurring phase are used as an energized phases.

According to the configuration of the electric power steering system as described above, the power drop in the continuous control after the occurrence of the energization failure can be prevented. When the basic command is equal to or smaller than an upper limit that is set to a normal system that gives high priority to the output of the control signal, power supply in which the two phases other than the energization failure occurring phase are used as the energized phase in the other system where the energization failure has occurred, that is, the two-phase drive control is not executed. Therefore, torque characteristics similar to that before the occurrence of the energization failure can be maintained in the low assist region. In the high assist region, because the proportion of the assist force based on the execution of the two-phase drive control decreases, the effect of the torque ripple that arises through the execution of the two-phase drive control can be reduced. Therefore, the steering feel in the continuous control after the occurrence of the energization failure can be improved effectively.

In the electric power steering system, it is preferable for the control signal output section to output the control signal to the energized phase of the system where the energization failure occurs in order to flow phase current that varies in a secant curve pattern or a cosecant curve pattern by setting specified rotation angles corresponding to the energization failure occurring phase as an asymptote.

According to the configuration of the electric power steering system as described above, even in the two-phase drive control after the occurrence of the energization failure, the q-axis current value in the d/q coordinate system becomes, in theory, a constant value corresponding to the q-axis current command value as with the three-phase drive control in the normal condition. Therefore, the torque ripple that arises through the execution of the two-phase drive control can be prevented effectively.

In the electric power steering system, it is preferable that the control signal output section limits the phase current in order to avoid the occurrence of excessive flow of electric current and outputs the control signal so as to supply the electric power beyond the upper limit, when the power supply is restricted through the current limit in the system where the energization failure has occurred, in the normal system that gives high priority to the output of the control signal, in order to compensate for restriction of the power supply in the system where the energization failure has occurred. Here, the upper limit may be set to be ½ of the maximum value of the basic command for the power supply.

According to the configuration of the electric power steering system as described above, when the two-phase drive control is executed in the system where the energization failure has occurred, the torque ripple that arises through the limitation of the phase current can be cancelled out with the torque of the normal system. Therefore, the steering feel in the continuous control after the occurrence of the energization failure can be improved more effectively.

In the electric power steering system, it is preferable for the control signal output section to increase or decrease the power supply in which the two phases other than the energization failure occurring phase are used as the energized phases in the system where the energization failure has occurred, depending on vehicle speed. In this case, the control signal output section may decrease the power supply in which the two phases other than the energization failure occurring phase are used as the energized phases in the system where the energization failure has occurred, as the vehicle speed increases. In addition, it is preferable to control the output of the control signal to the system, where the energization failure has occurred, to be zero, when the vehicle speed is equal to or greater than a specified value.

In a low vehicle speed region where the demand for assist is high, better steering feel can often be achieved by preventing the power reduction through the use of the torque in the system where the energization failure has occurs even after the consideration of the torque ripple (even if the torque ripple is generated) that arises through the execution of the two-phase drive control. On the other hand, the presence of the torque ripple creates difficulty in fine steering angle adjustment. As a result, if the two-phase drive control that is preferable for the low vehicle speed region is directly applied to the high vehicle speed region, in a high vehicle speed region where change in the steering angle have large effect on the vehicle attitude, the steering feel may decrease.

According to the configuration of the electric power steering system as described above, in the high vehicle speed region where the effect of the torque ripple that arises through the execution of the two-phase drive control becomes obvious, by decreasing the power supply to the system where the energization failure has occurred or by stopping the power supply so as not to execute the two-phase drive control, the fine steering angle adjustment can be facilitated. As a result, the steering feel can be improved in wide vehicle speed region.

In the electric power steering system, it is preferable for the steering force assist device to utilize as a drive source a motor that has a stator and a rotor that are shared by the motor coils. According to the configuration of the electric power steering system as described above, the steering feel in the continuous control after the occurrence of the energization failure can be improved without upsizing of devices.

According to the present invention, the electric power steering system that can improve the steering feel in the continuous control after the occurrence of the energization failure can be provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
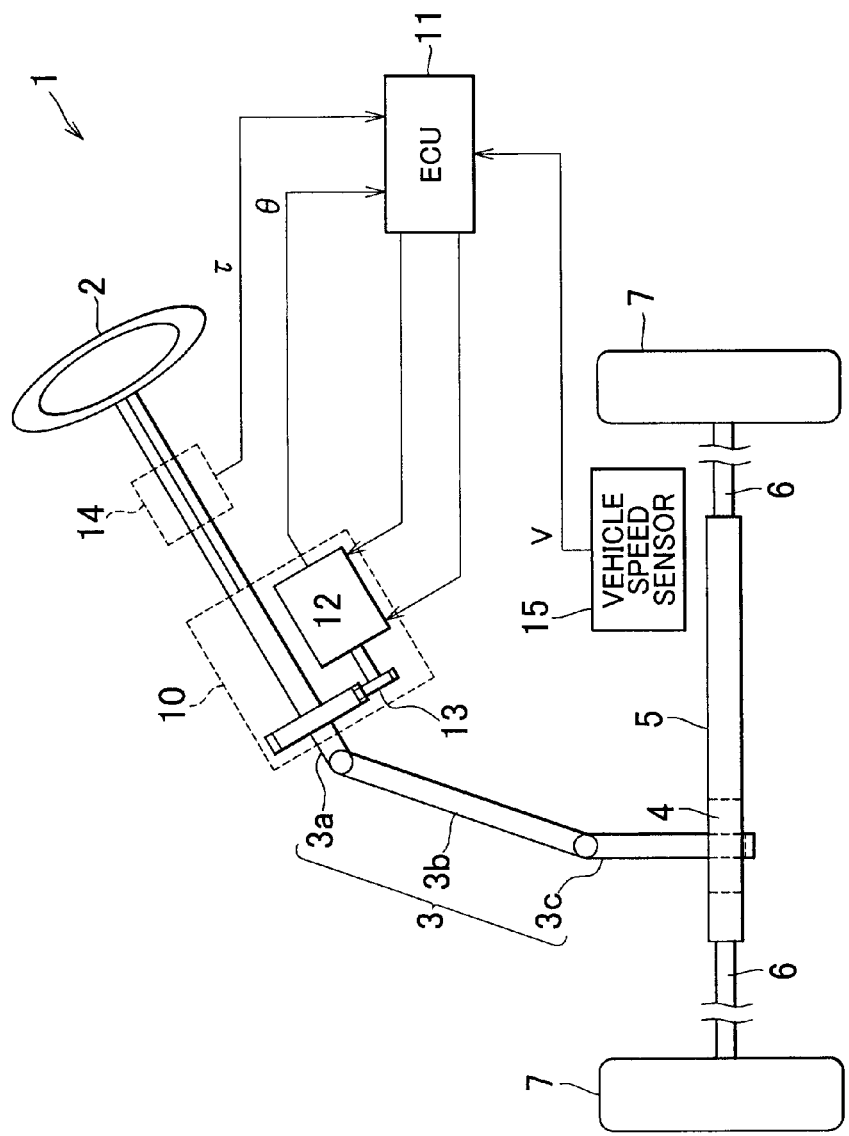
FIG. 1 is a schematic configuration diagram of the electric power steering system (EPS) according to a first embodiment of the present invention.

Hereinafter, a first embodiment that embodies the present invention will be described with reference to the attached drawings. As shown in FIG. 1, an electric power steering system (EPS) 1 of the present embodiment includes a steering wheel 2, a steering shaft 3, a rack-and-pinion system 4, and a rack shaft 5 so that the steering shaft 3 to which the steering wheel 2 is fixed is connected to the rack shaft 5 through the rack-and-pinion system 4. The rotation of the steering shaft 3 associated with a steering operation is converted into reciprocating movement of the rack shaft 5 by the rack-and-pinion system 4. The steering shaft 3 of the present embodiment includes a column shaft 3a, an intermediate shaft 3b, and a pinion shaft 3c such that those shafts are connected in this order. The reciprocating movement of the rack shaft 5 associated with the rotation of the steering shaft 3 is transmitted to steering knuckles (not shown) through tie rods 6 that are connected to ends of the rack shaft 5, and therefore, steering angles of wheels 7, namely a traveling direction of the vehicle is changed.

The EPS 1 includes an EPS actuator 10 as a steering force assist device that gives an assist force for supporting the steering operation to the steering system, and an ECU 11 as a controller that controls the actuation of the EPS actuator 10.

The EPS actuator 10 according to the present embodiment is constructed as a so-called column type EPS actuator such that a motor 12 as a drive source is connected to and drives the column shaft 3a through a reduction gear mechanism 13. The EPS actuator 10 is also constructed to reduce and transmit the rotational speed of the motor 12 to transmit to the column shaft 3a and thereby to give the motor torque as the assist force to the steering system.

Meanwhile, the ECU 11 is connected with a torque sensor 14 and a vehicle speed sensor 15. The ECU 11 computes the assist force (a target assist force) to be given to the steering system based on the steering torque t and the vehicle speed V that are detected through output signals from the sensors. The ECU 11 controls the actuation of the EPS actuator 10, namely the assist force that is given to the steering system through the power supply to the motor 12 as the drive source (power assist control) in order to generate the target assist force on the EPS actuator 10.

Figure 2:
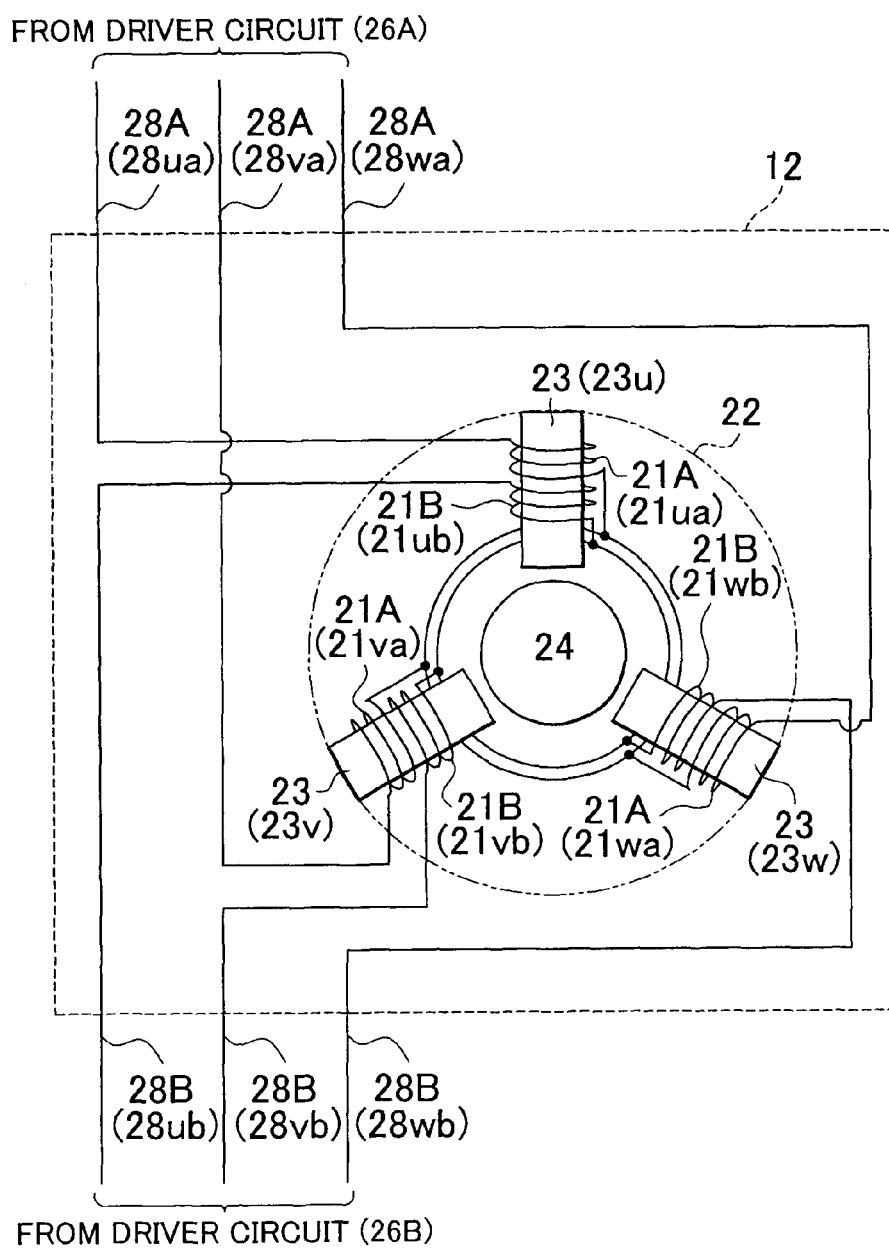
FIG. 2 is a schematic configuration diagram of the motor that is shown in FIG. 1.

Next, an electrical configuration of the EPS according to the present embodiment will be described. As shown in FIG. 2, the motor 12 of the present embodiment is constructed such that independent dual-system motor coils 21A and 21B are wound around an identical stator 22. Specifically, a first system motor coil 21A (21$ua$, 21$va$, and 21$wa$) and a second system motor coil 21B (21$ub$, 21$vb$, and 21$wb$) are respectively wound around teeth 23 (23$u$, 23$v$, and 23$w$) of the stator 22 for corresponding phases (U, V, and W). A rotor 24 that is supported for rotation is provided in a radially inner side of the teeth 23 (23$u$, 23$v$, and 23$w$).

That is, the motor 12 of the present embodiment has the stator 22 and the rotor 24 that are shared by the dual-system motor coils 21A and 21B. The rotor 24 rotates upon magnetomotive force that is generated by the motor coils 21A and 21B wound around the teeth 23 (23$u$, 23$v$, and 23$w$). The ECU 11 of the present embodiment is configured to control the motor torque by independently supplying drive electric power to the motor coils 21A and 21B.

Figure 3:
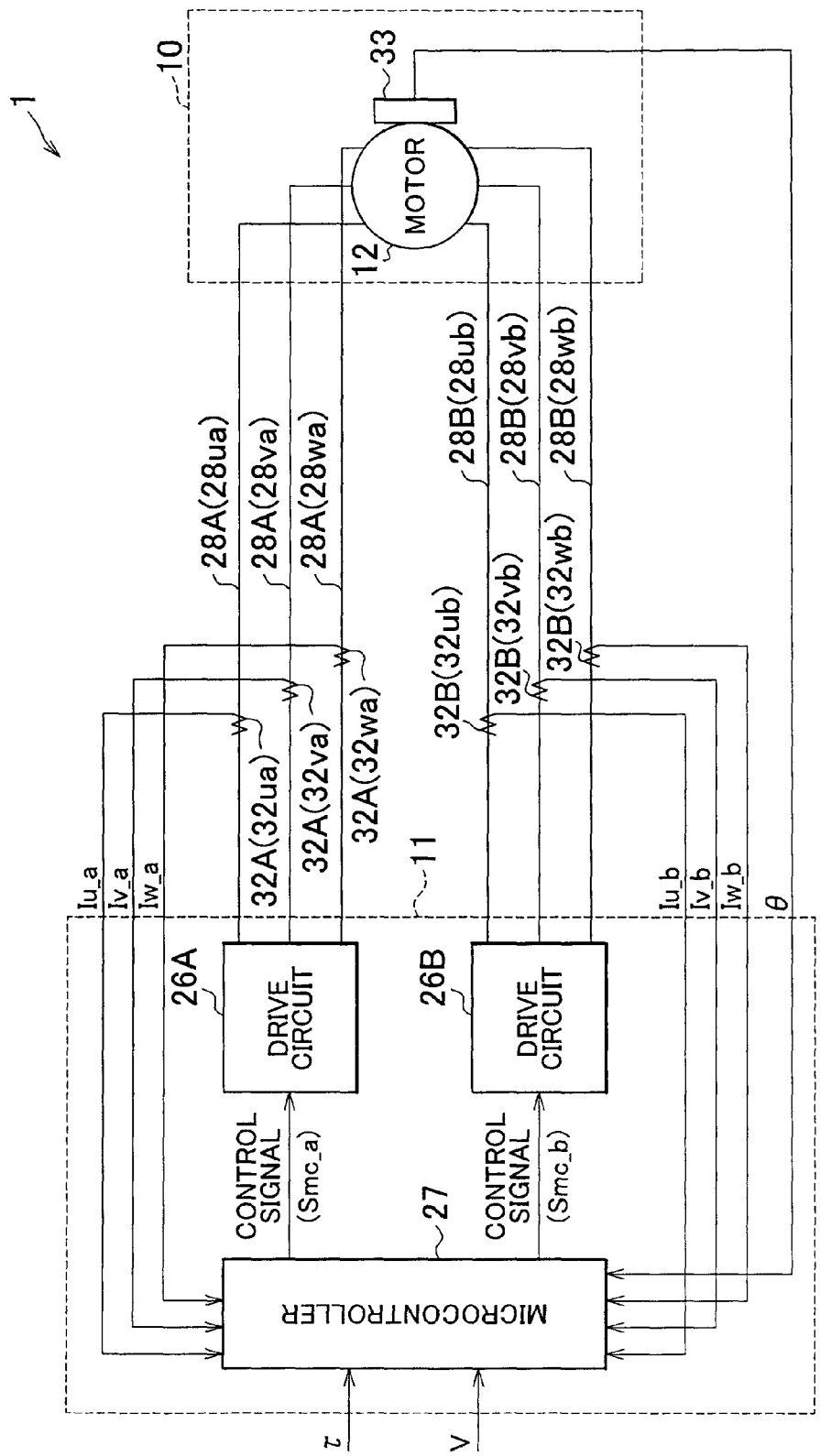
FIG. 3 is a control block diagram of the EPS that is shown in FIG. 1.

As shown in FIG. 3, the ECU 11 of the present embodiment includes two driver circuits 26A and 26B that are independently provided in connection with the motor coils 21A and 21B, and a microcontroller 27 that outputs control signals Smc_a and Smc_b independently to the driver circuits 26A and 26B.

More specifically, the driver circuit 26A is connected to the first system motor coil 21A through power lines 28A (28$ua$, 28$va$, and 28$wa$), and the driver circuit 26B is connected to the second system motor coil 21B through power lines 28B (28$ub$; 28$vb$, and 28$wb$). The control signal Smc_a that is output from the microcontroller 27 is entered into the driver circuit 26A, and the other control signal Smc_b is entered into the driver circuit 26B. Here, the present embodiment employs for the driver circuits 26A and 26B well-known PWM inverters (pulse width modulators) that has a pair of switching elements connected in series as the basic unit (i.e. an arm) and connects three arms corresponding to respective phases in parallel. The control signal that is output from the microcontroller 27 defines ON-duty cycle of each phase arm. The ECU 11 of the present embodiment is configured to independently supply the drive electric power that is output by the driver circuits 26A and 26B to the corresponding motor coils 21A and 21B based on the control signals Smc_a and Smc_b.

Figure 4:
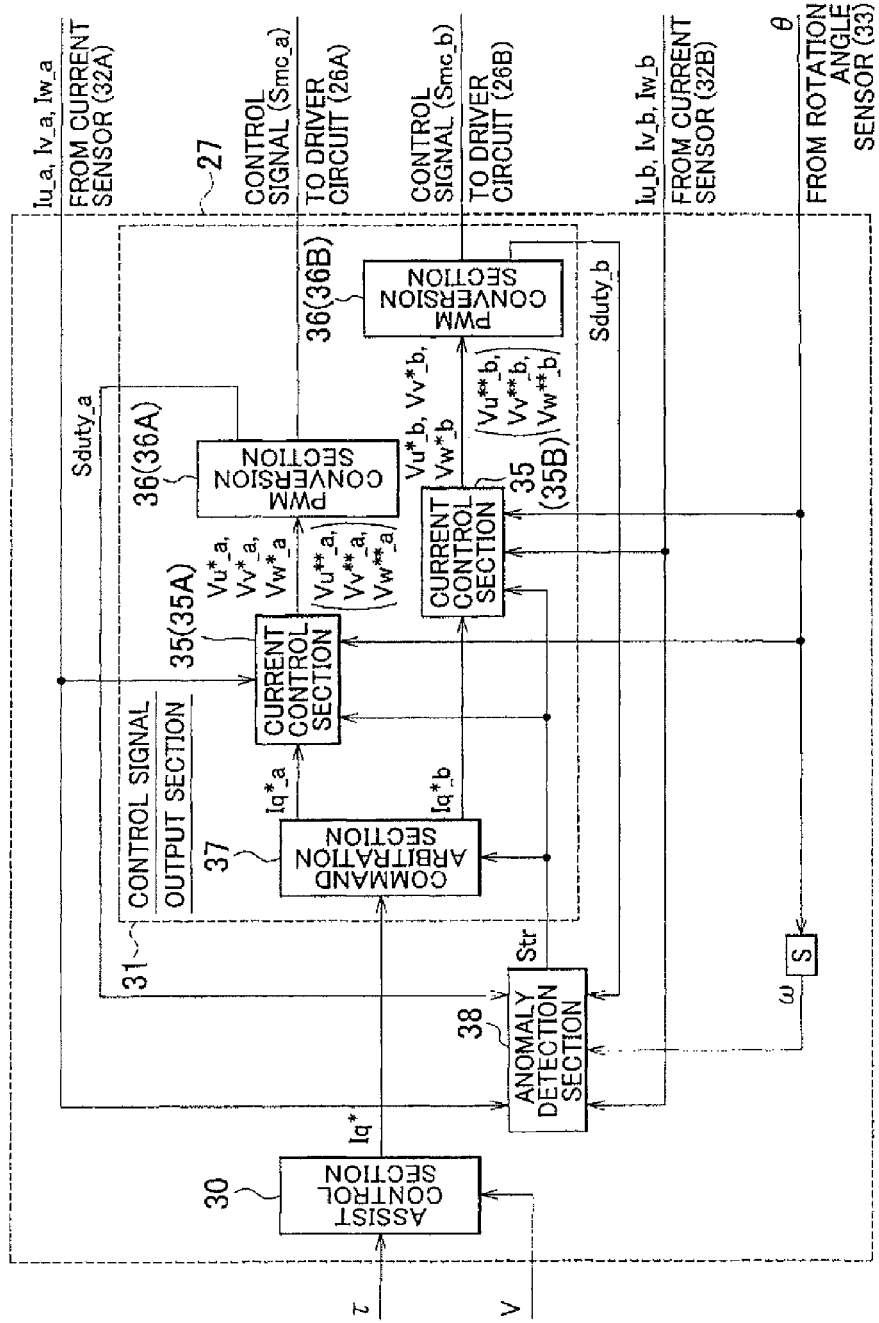
FIG. 4 is a control block diagram of the EPS that is similar to FIG. 3.

Particularly, as shown in FIG. 4, the microcontroller 27 of the present embodiment includes an assist control section 30 that generates the basic command Iq* for the power supply to the motor 12 and a control signal output section 31 that outputs the dual-system control signals Smc_a and Smc_b based on the basic command Iq*, in order to generate the motor torque corresponding to the target assist force.

In the present embodiment, the assist control section 30 as a command section computes a current command value corresponding to the target assist force based on the steering torque τ that is detected by the torque sensor 14 and the vehicle speed V that is detected by the vehicle speed sensor 15. Specifically, the assist control section 30 computes the current command value such that larger assist force is generated when the steering torque τ is larger or the vehicle speed V is slower. The assist control section 30 is configured to output the current command value based on the steering torque τ and the vehicle speed V as the basic command Iq* for the power supply to the motor 12 to the control signal output section 31.

Meanwhile, the control signal output section 31 that configures the control signal output section receives phase current values Iu_a, Iv_a, Iw_a and Iu_b, Iv_b, Iw_b that respectively flow into the motor coils 21A and 21B in the respective systems and a rotation angle θ of the motor 12. In the present embodiment, the phase current values Iu_a, Iv_a, Iw_a and Iu_b, Iv_b, Iw_b are independently detected by current sensors 32A (32$ua$, 32$va$, and 32$wa$) and 32B (32$ub$, 32$vb$, and 32$wb$) that are respectively disposed on the power lines 28A and 28B in the respective systems, while the rotation angle θ of the motor 12 is detected by a shared rotation angle sensor 33. The control signal output section 31 of the present embodiment is configured to execute a current feedback control based on state quantities and the basic command Iq* that is output by the assist control section 30 and thereby to output the control signals Smc_a and Smc_b in connection with the driver circuits 26A and 26B.

More particularly, the control signal output section 31 of the present embodiment includes a current control section 35A and a PWM converting section 36A in connection with the first system (the system that includes the driver circuit 26A, the motor coil 21A, and the power line 28A), and a current control section 35B and a PWM converting section 36B in connection with the second system (the system that includes the driver circuit 26B, the motor coil 21B, and the power line 28B). The control signal output section 31 also includes a command arbitration section 37 that splits the basic command Iq* that is entered from the assist control section 30 into a first control command Iq*_a and a second control command Iq*_b for output. The current control sections 35 (35A and 35B) are configured to independently execute the current feedback control based on the entered first control command Iq*_a and second control command Iq*_b, respectively.

Specifically, the current control sections 35 (35A and 35B) converts the phase current values Iu_a, Iv_a, Iw_a and Iu_b, Iv_b, Iw_b of the corresponding system into d-axis current values and q-axis current values of d/q coordinate system in accordance with the rotation angle θ of the motor 12 (d/q conversion). The first control command Iq*_a and the second control command Iq*_b are entered as q-axis current command values (d-axis current command values are "0"). the current control sections 35 (35A and 35B) map d-axis voltage command values and q-axis voltage command values that are obtained from the execution of the current feedback control in the d/q coordinate system onto alternating current coordinates of three phases (d/q reverse conversion), and respectively compute phase voltage command values Vu*_a, Vv*_a, Vw*_a and Vu*_b, Vv*_b, Vw*_b of the corresponding systems.

The PWM converting sections 36 (36A and 36B) are respectively configured to output the control signals Smc_a and Smc_b for the driver circuits 26A and 26B of the corresponding systems based on the phase voltage command values Vu*_a, Vv*_a, Vw*_a and Vu*_b, Vv*_b, Vw*_b that are entered from the corresponding current control sections 35 (35A and 35B).

Next, the continuous control after the occurrence of the energization failure in the present embodiment will be described. As shown in FIG. 4, the microcontroller 27 of the present embodiment is provided with an anomaly detection section 38 that can detect the occurrence of the energization failure on power supply paths of the systems in connection with the motor coils 21A and 21B.

Specifically, the anomaly detection section 38 of the present embodiment receives the phase current values Iu_a, Iv_a, Iw_a and Iu_b, Iv_b, Iw_b that are flown into the motor coils 21A and 21B of the systems, duty signals Sduty_a and Sduty_b that indicate ON-duties of the phases defined by the control signals Smc_a and Smc_b, and rotation angular velocity w of the motor 12. The anomaly detection section 38 as a detection section is configured to detect the occurrence of the energization failure in the systems with respect to each phase based on the state quantities.

That is, although the duty signals Sduty_a and Sduty_b indicate that the state is in an energized state for any of the phases, when the phase current values are the values that indicate de-energized states, the anomaly detection section 38 can determine that the energization failure occurs in the phase. The anomaly detection section 38 of the present embodiment is also configured to add a speed condition based on the rotation angular velocity ω of the motor, to exclude high speed rotation period in which the effect of counter-electromotive voltage becomes obvious, and thereby being able to accurately detect the occurrence of the energization failure.

In the present embodiment, a result of anomaly detection by the anomaly detection section 38 is entered into the control signal output section 31 as an anomaly detection signal Str. The control signal output section 31 of the present embodiment is configured to give first priority to the output of the control signal to the driver circuit in one of the dual systems in connection with the motor coils 21A and 21B when the occurrence of the energization failure is detected in the other system.

Figure 5:
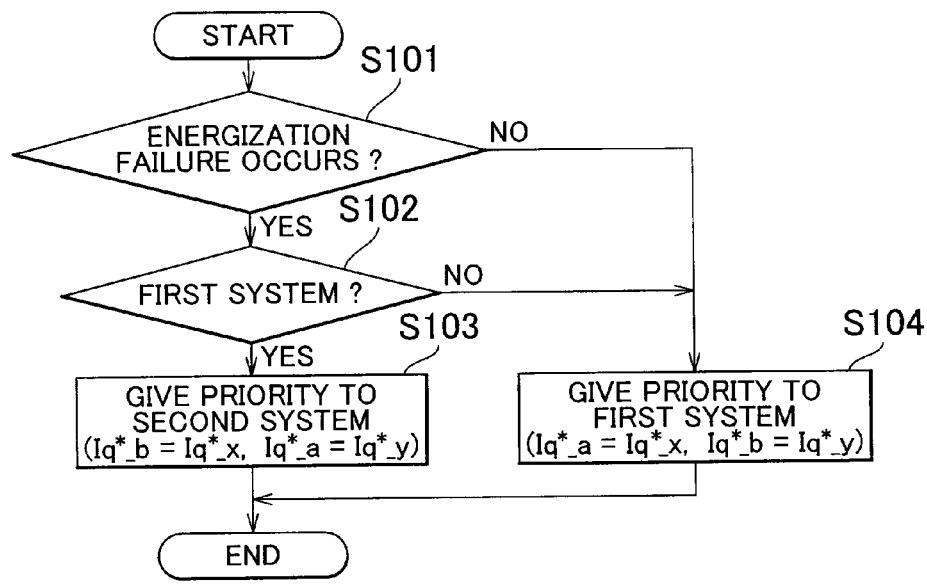
FIG. 5 is a flowchart that shows operating procedures of output priority determination in the electric power steering system according to the first embodiment.

Particularly, as shown in the flowchart of FIG. 5, the control signal output section 31 of the present embodiment determines, when the entered anomaly detection signal Str indicates the detection of the energization failure (Step 101: YES), whether the energization failure has occurred in the first system in connection with the motor coil 21A or not (Step 102). When the energization failure has occurred in the first system (Step 102: YES), the control signal output section 31 gives higher priority to the output of the control signal Smc_b to the driver circuit 26B in the second system in connection with the motor coil 21B (Step 103).

The control signal output section 31 also gives higher priority to the output of the control signal Smc_a to the driver circuit 26A in the first system (Step 104) when the energization failure has occurred in the second system (Step 102: NO). In addition, the present embodiment has a configuration such that, in Step 101, when the control signal output section 31 determines that the anomaly detection signal Str does not indicate the occurrence of the energization failure (Step 101: NO), the output of the control signal Smc_a to the driver circuit 26A in the first system has higher priority in Step 104.

More particularly, in the control signal output section 31 of the present embodiment, the command arbitration section 37 computes a priority command Iq*_x and a complementary command Iq*_y based on the basic command Iq* entered from the assist control section 30. The command arbitration section 37 divides the priority command Iq*_x and the complementary command Iq*_y into the first control command Iq*_a as a base for the control signal Smc_a in connection with the driver circuit 26A in the first system and the second control command Iq*_b as a base for the control signal Smc_b in connection with the driver circuit 26B in the second system.

Figure 6:
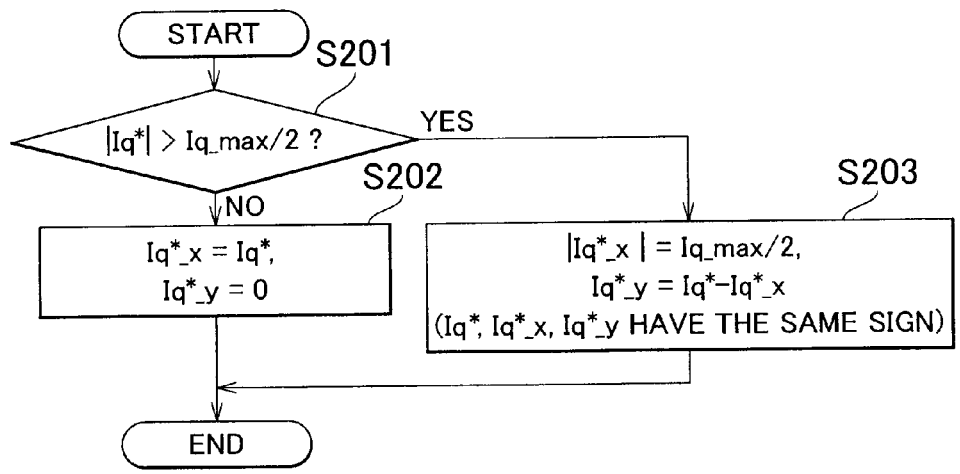
FIG. 6 is a flowchart that shows operating procedures about a split output of a basic command in the electric power steering system according to the first embodiment.

Specifically, as shown in the flowchart of FIG. 6, the command arbitration section 37 of the present embodiment first determines whether a value (absolute value) of the entered basic command Iq* exceeds the half ("½") of the command maximum value Iq_max corresponding to the maximum target assist force or not (Step 201). When the basic command Iq* is the "½" of the command maximum value Iq_max (Iq*≤Iq_max/2; Step 201: NO), the value of the basic command Iq* is set as the value of the prior command Iq*_x, and zero ("0") as the complementary command Iq*_y is computed (Iq*_x=Iq*, Iq*_y=0; Step 202).

On the other hand, in Step 201, when the value (absolute value) of the basic command Iq* exceeds "½" of the command maximum value Iq_max (Step 201: YES), in Step 202 the command arbitration section 37 computes the priority command Iq*_x of which the absolute value is equal to "½" of the command maximum value Iq_max and that has the same sign as the basic command Iq*. In order to set the same sign as the basic command Iq*, so-called signum function that outputs the sign of an input value may be used, for example. As the complementary command Iq*_y, the command arbitration section 37 computes the difference between the basic command Iq* and the priority command Iq*_x, that is the excess of the upper limit (Iq_max/2) that has been set as the priority command Iq*_x(|Iq*_x|=Iq_max/2, Iq*_y=Iq*−Iq*_x, Step 203).

As described above, in the present embodiment, the priority command Iq*_x that has a larger absolute value than the complementary command Iq*_y is computed. Output priority of one of the control signals Smc_a and Smc_b is based on such the division of the priority command Iq*_x and the complementary command Iq*_y that is executed at splitting the basic command Iq* entered from the assist control section 30 into the first control command Iq*_a and the second control command Iq*_b for output.

That is, in the present embodiment, the output priority determination of the control signals Smc_a and Smc_b that is shown in the flowchart of FIG. 5 is executed in the command arbitration section 37 like the split output of the basic command Iq*. In other words, the command arbitration section 37 outputs, when giving higher priority to the first system, the priority command Iq*_x as the first control command Iq*_a and the complementary command Iq*_y as the second control command Iq*_b (see FIG. 5: Step 104, Iq*_a=Iq*_x, Iq*_b=Iq*_y). When giving higher priority to the second system, the command arbitration section 37 is configured to output the priority command Iq*_x as the second control command Iq*_b and the complementary command Iq*_y as the first control command Iq*_a. (See FIG. 5: Step 103, Iq*_b=Iq*_x, Iq*_a=Iq*_y).

The control signal output section 31 of the present embodiment determines the occurrence or non-occurrence of the energization failure in the systems and the number of phases where the energization failure occurs, based on the anomaly detection signal Str. When the energization failure occurring phase is only one phase, the control signal output section 31 outputs the control signal to the driver circuit in the energization failure occurring system in order to supply electric power in which the two phases other than the energization failure occurring phase are used as the energized phases.

Figure 7:
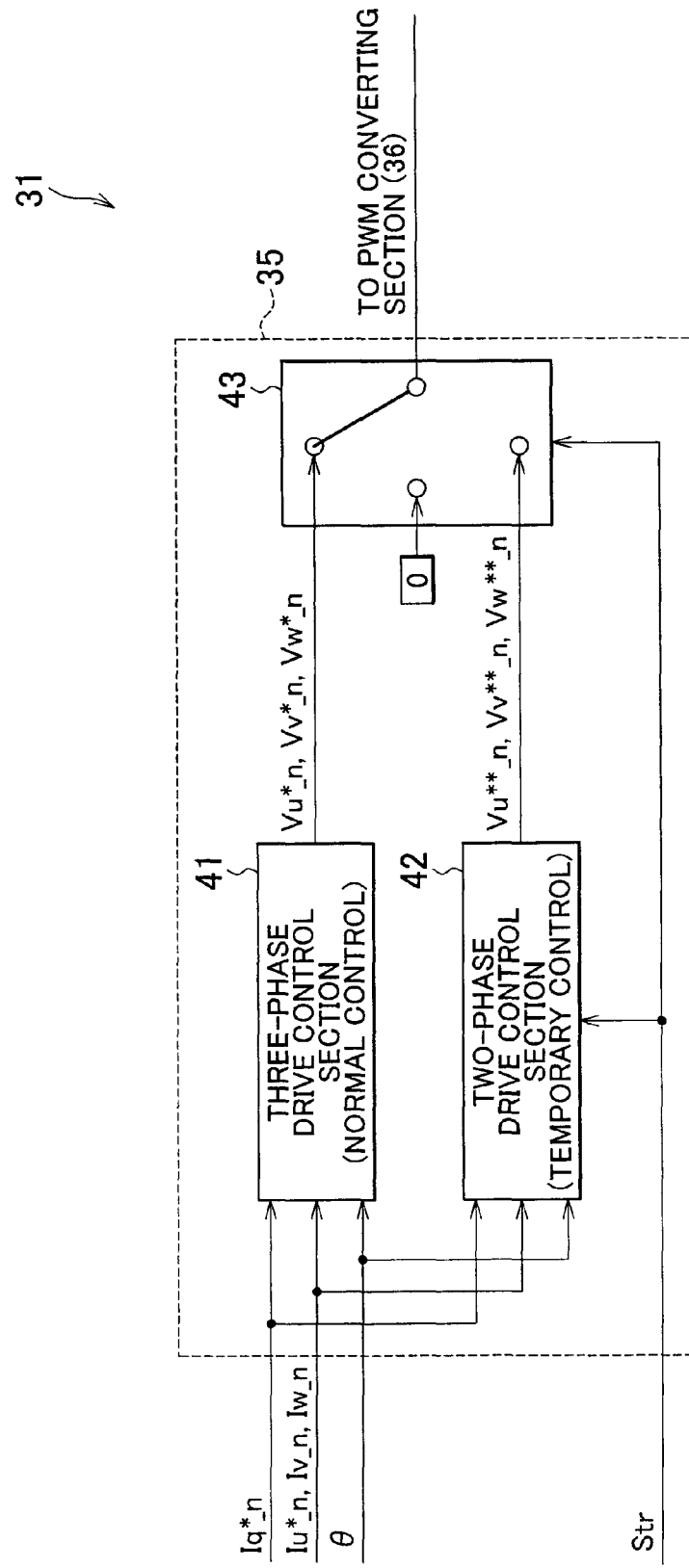
FIG. 7 is a control block diagram that illustrates a schematic configuration of a current control section in the electric power steering system according to the first embodiment.

Particularly, as shown in FIG. 7, the current control sections 35 that is disposed in the control signal output section 31 of the present embodiment (see FIG. 4) is provided with a three-phase drive control section 41 that computes the phase voltage command values Vu*_n, Vv*_n, and Vw*_n in order to supply three-phase drive electric power as described above in the normal condition in which the occurrence of the energization failure is not detected in the connected systems.

In this case, the symbol "_n" indicates either one of "_a" that corresponds to the first system or "_b" that corresponds to the second system. Therefore, in FIG. 7 for example, when the current control section 35 is the current control section 35A in connection with the first system, the phase current values Iu_n, Iv_n, and Iw_n that are entered into the current control section 35 indicate "Iu_a, Iv_a, and Iw_a," respectively.

The current control sections 35 of the present embodiment also includes, in addition to the three-phase drive control section 41, a two-phase drive control section 42 that computes the phase voltage command values Vu_n, Vv_n, and Vw**_n in order to supply the drive electric power in which the two phases other than the energization failure occurring phase are used as the energized phases when the occurrence of the energization failure is detected in the connected system and the energization failure occurring phase is only one phase.

Figure 8:
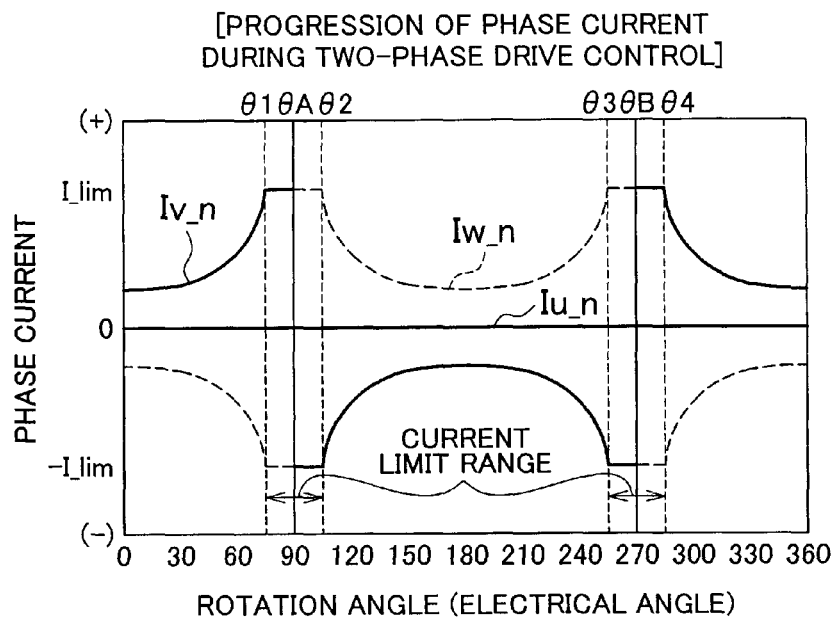
FIG. 8 is a chart that shows the progression of phase current during the two-phase drive control (during U-phase energization failure) in the electric power steering system according to the first embodiment.

Specifically, as shown in FIG. 8, the two-phase drive control section 42 of the present embodiment computes the phase voltage command values Vu_n, Vv_n, and Vw**_n for flowing to the energized phase the phase current that varies in the secant curve pattern or the cosecant curve pattern by setting the specified rotation angles θA and θB corresponding to the energization failure occurring phase as an asymptote in order to supply the electric power in which the two phases are used as the energized phases (two-phase drive control).

The "secant curve" and the "cosecant curve" are curves based on the "inverse of cos θ (secant: sec θ)" and the "inverse of sin θ (cosecant: cosec θ )", respectively. FIG. 8 is an example that shows a case where the energization failure occurs in the U-phase. The specified rotation angles θA and θB corresponding to the energization failure occurring phase in this case are 90° and 270°, respectively.

Figure 9:
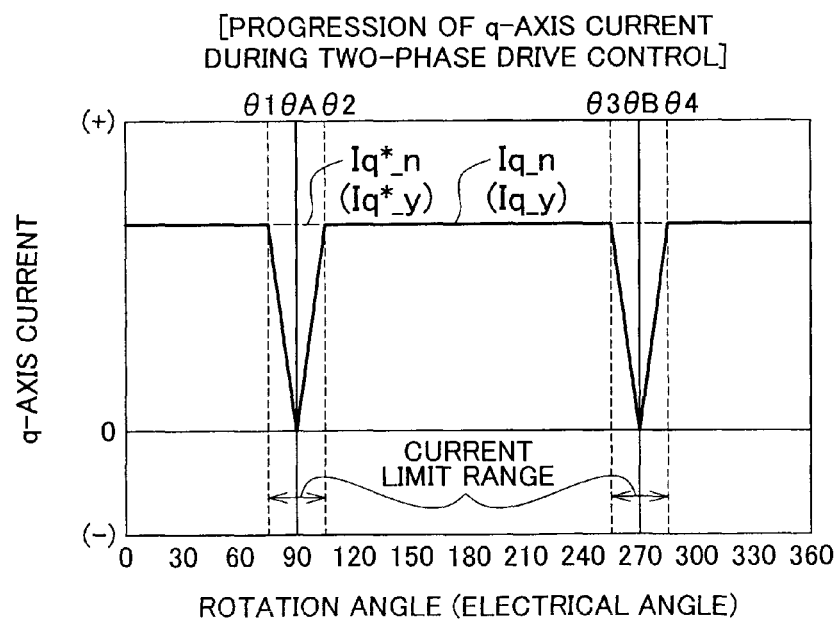
FIG. 9 is a chart that shows the progression of q-axis current during the two-phase drive control (during U-phase energization failure) in the electric power steering system according to the first embodiment.

That is, as shown in FIG. 9, by the flow of the phase current that varies in the secant curve pattern or the cosecant curve pattern as described above, even in the two-phase drive control after the occurrence of the energization failure, the q-axis current value (Iq_n, in FIG. 9, a waveform of a solid line) in the d/q coordinate system becomes, in theory, a constant value corresponding to the q-axis current command value (control command Iq*_n, in FIG. 9, a waveform of an alternate long and short dashed line) as with the three-phase drive control in the normal condition.

However, the two-phase drive control section 42 of the present embodiment limits the phase current values (Iv_n and Iw_n in the example shown in FIG. 8) to a limit value (|I_lim|) or smaller in order to avoid the occurrence of excessive flow of electric current in the energized phase. Therefore, within current limit range (θ1-θ2 and θ3-θ4) that is formed in the vicinity of the specified rotation angles θA and θB that become the asymptote, the power supply is restricted, that is, the q-axis current (Iq*_n) decreases.

However, except for the current limit range, the phase voltage command values Vu_n, Vv_n, and Vw**_n are computed such that the q-axis current that has a constant value (Iq_n) corresponding to the entered control command Iq*_n is generated. Thus, the torque ripple that arises through the execution of the two-phase drive control can be prevented.

For the details of the two-phase drive control by flowing the phase current that varies in the secant curve pattern or the cosecant curve pattern by setting the specified rotation angle corresponding to the energization failure occurring phase as an asymptote, refer to the disclosure in JP-A-2008-211909 and JP-A-2008-211910.

As shown in FIG. 7, in the control signal output section 31 of the present embodiment, the phase voltage command values Vu*_n, Vv*_n, and Vw*_n that are computed in the three-phase drive control section 41 and the phase voltage command values Vu_n, Vv_n, and Vw**_n that are computed in the two-phase drive control section 42 are entered into a switching control section 43 with the anomaly detection signal Str.

That is, in the control signal output section 31 of the present embodiment, the switching control section 43 outputs the phase voltage command values Vu*_n, Vv*_n, and Vw*_n that are entered from the three-phase drive control section 41 to the connected PWM converting section 36 when the entered anomaly detection signal Str indicates that "the occurrence of the energization failure in the connected system is not detected" (normal control).

On the other hand, when the anomaly detection signal Str indicates that "the occurrence of the energization failure in the connected system is detected and the energization failure occurring phase is only one phase", the switching control section 43 outputs the phase voltage command values Vu_n, Vv_n, and Vw**_n that are computed in the two-phase drive control section 42 to the connected PWM converting section 36 (temporary control). Thus, the present embodiment has a configuration such that, when the energization failure occurring phase is only one phase at the occurrence of the energization failure, electric power, in which the two phases other than the energization failure occurring phase are used as the energized phase, is supplied also in the system where the energization failure has occurred.

When the anomaly detection signal Str indicates "the energization failure occurring phase is not located," the switching control section 43 of the present embodiment does not output either of the phase voltage command values Vu*_n, Vv*_n, and Vw*_n that are computed in the three-phase drive control section 41 or the phase voltage command values Vu_n, Vv_n, and Vw_n that are computed in the two-phase drive control section 42**. Incidentally, when "the energization failure occurring phase is not located," the energization failure is often occurring in all two or three phases. Thus, the present embodiment employs the configuration that stops the power supply in the system where the energization failure has occurred and immediately provides a fail-safe.

Next, the action of the EPS of the present embodiment that is configured as described above will be described. As described above, in the EPS 1 of the present embodiment, the EPS actuator 10 utilizes the motor 12 that generates the motor torque based on the magnetomotive force that is generated in the independent dual-system motor coils 21A and 21B as the drive source (see FIG. 2).

In the microcontroller 27 on the side of the ECU 11, the control signal output section 31 that outputs independent dual-system control signals Smc_a and Smc_b to the driver circuits 26A and 26B in connection with the motor coils 21A and 21B computes the priority command Iq*_x and the complementary command Iq*_y based on the basic command Iq* that is output by the assist control section 30. The control signal output section 31 divides the priority command Iq*_x and the complementary command Iq*_y into the first control command Iq*_a that is used for generation of the control signal Smc_a that is output to the driver circuit 26A in the first system and the second control command Iq*_b that is used for generation of the control signal Smc_b that is output to the driver circuit 26B in the second system (see FIGS. 4 and 5).

Figure 10:
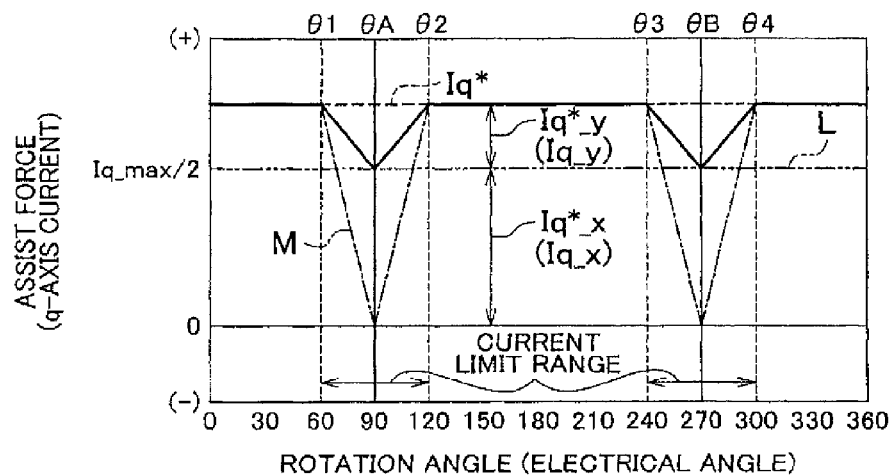
FIG. 10 is a chart that shows an aspect of the continuous control after the occurrence of the energization failure according to the first embodiment.

Therefore, as shown in FIG. 10, the assist force that is generated by the EPS actuator 10 is equal to the sum of the motor torque based on priority current Iq_x that flows into the motor coil in the system that gives high priority to the control signal output on the bases of the priority command Iq*_x and the motor torque based on complementary current Iq_y that flows into the motor coil in the other system on the basis of the complementary command Iq*_y. If the electric power is normally supplied to the motor coils 21A and 21B, generating assist force is equal to the target assist force that is indicated by the basic command Iq* in theory.

However, in the configuration that stops the power supply to the system where the energization failure has occurred when the occurrence of the energization failure is detected, the assist force that can be applied to the steering system in the continuous control after the occurrence of the energization failure drops to the value corresponding to "½" of the command maximum value Iq_max that is set as the upper limit of the prior current Iq_x, that is the half of the maximum target assist force (in FIG. 10, the waveform L shown with an alternate long and two short dashed line). The increase of the load to the driver associated with the power drop may lead the decrease of steering feel.

However, even after the occurrence of the energization failure is detected as in the above configuration, when the energization failure occurring phase is only one phase, the power drop in the continuous control as described above can be prevented by means of executing the control signal output to the driver circuit in the energization failure occurring system in order to supply electric power in which the two phases other than the energization failure occurring phase are used as the energized phases. By means of executing the control signal output in order to flow to the energized phase the phase current that varies in the secant curve pattern or the cosecant curve pattern, the torque ripple that arises through the execution of the two-phase drive control can be prevented.

In addition, when the basic command Iq* corresponding to the target assist force is "½" of or smaller than the command maximum value Iq_max that is set as the upper limit of the prior current Iq_x, the complementary command Iq*_y is not computed (Iq*_y=0). That is, the two-phase drive control is not executed in the system where the energization failure has occurred. Therefore, torque characteristics similar to that before the occurrence of the energization failure are maintained in a low assist region. In a high assist region, because the proportion of the assist force based on the execution of the two-phase drive control decreases, the effect of the torque ripple can be reduced.

The waveform M that is shown with an alternate long and short dashed line in FIG. 10 is an output waveform (reference example) when the two-phase drive control similar to the present embodiment is executed in the general configuration that includes an ordinary motor having single system motor coil as the drive source.

According to the present embodiment, the following effects can be obtained. (1) The control signal output section 31 outputs the independent dual-system control signals Smc_a and Smc_b to the driver circuits 26A and 26B that are disposed in connection with the independent dual-system motor coils 21A and 21B. The control signal output section 31 also computes the priority command Iq*_x and the complementary command Iq*_y based on the basic command Iq* for the power supply to divide the priority command Iq*_x to the other system when the occurrence of the energization failure is detected in one system, and therefore, gives the high priority to the control signal output to the other system. When the energization failure occurring phase is only one phase and the value (absolute value) of the basic command Iq* exceeds the upper limit of the priority command Iq*_x(Iq_max/2), the control signal output section 31 outputs the control signal to the driver circuit in the system where the energization failure has occurred in order to supply electric power in which the two phases other than the energization failure occurring phase are used as the energized phases on the bases of the complementary command Iq*_y that corresponds to the excess of the upper limit.

According to the above configuration, the power drop in the continuous control after the occurrence of the energization failure can be prevented. Because the complementary command Iq*_y is not computed (Iq*_y=0) when the basic command Iq* is the upper limit (Iq_max/2) of the prior current Iq_x or smaller, the two-phase drive control is not executed in the system where the energization failure has occurred. Therefore, torque characteristics similar to that before the occurrence of the energization failure can be maintained in the low assist region. In the high assist region, because the proportion of the assist force based on the execution of the two-phase drive control decreases, the effect of the torque ripple that arises through the execution of the two-phase drive control can be reduced. Therefore, the steering feel in the continuous control after the occurrence of the energization failure can be improved effectively.

(2) The control signal output section 31 executes the control signal output to the system where the energization failure has occurred in order to flow, to the energized phase in the energization failure occurring system that supplies the electric power in which the two phases are used as the energized phases (two-phase drive control), the phase current that varies in the secant curve pattern or the cosecant curve pattern by setting the specified rotation angles θA and θB corresponding to the energization failure occurring phase as an asymptote.

According to the above configuration, even in the two-phase drive control after the occurrence of the energization failure, the q-axis current value in the d/q coordinate system becomes, in theory, a constant value corresponding to the q-axis current command value as with the three-phase drive control in the normal condition. Therefore, the torque ripple that arises through the execution of the two-phase drive control can be prevented effectively.

(3) The EPS actuator 10 utilizes the motor 12, which has the stator 22 and the rotor 24 that are shared by the dual-system motor coils 21A and 21B, as the drive source. Accordingly, the steering feel in the continuous control after the occurrence of the energization failure can be improved without upsizing of devices.

Hereinafter, a second embodiment that embodies the present invention will be described with reference to the attached drawings. For convenience of description, the same configuration as the first embodiment is given with the same reference numeral and symbol, and the descriptions are not repeated.

Figure 11:
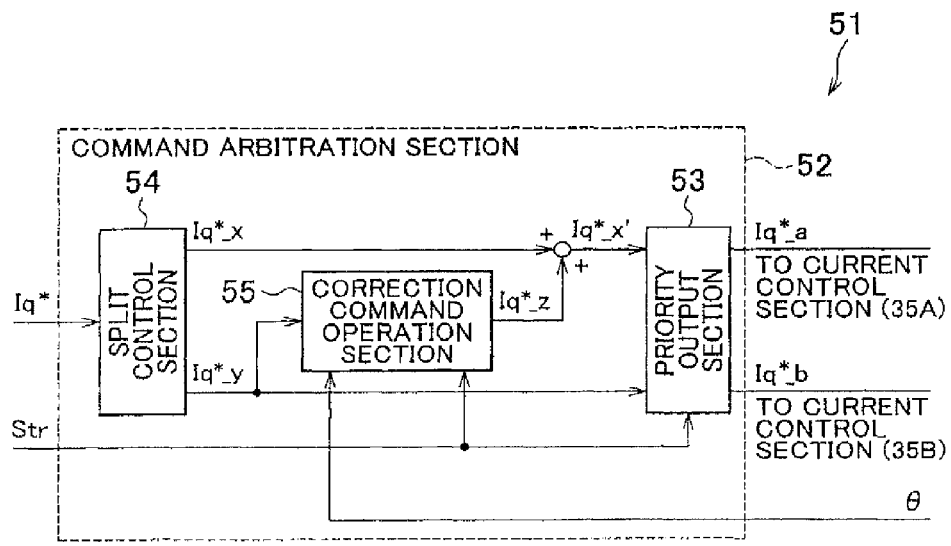
FIG. 11 is a control block diagram that illustrates a schematic configuration of a main component (a command arbitration section) according to a second embodiment of the present invention.

As shown in FIG. 11, the present embodiment differs from the first embodiment in the configuration of the command arbitration section 52 (37) that is provided in the control signal output section 51 (31) (see FIG. 4).

Particularly, the command arbitration section 52 of the present embodiment includes a priority output section 53 that determines the priority among the output of either the control signal Smc_a in connection with the driver circuit 26A in the first system and the output of the control signal Smc_b in connection with the driver circuit 26B in the second system, and a split control section 54 that splits the entered basic command Iq* into the priority command Iq*_x and the complementary command Iq*_y.

The operating procedures of the output priority determination that is executed by the priority output section 53 of the present embodiment and the split output that is executed by the split control section 54 are the same as the operating procedures of the output priority determination (see FIG. 5) and the operating procedures of the split output (see FIG. 6) that are executed by the command arbitration section 37 in the first embodiment, respectively.

The command arbitration section 52 of the present embodiment also includes a correction command operation section 55 that computes a correction command Iq*_z. The priority output section 53 receives the priority command Iq*_x' after the correction such that the correction command Iq*'_z is added to the priority command Iq*_x. The priority output section 53 is configured to divide the priority command Iq*_x' after the correction and the complementary command Iq*_y into the first control command Iq*_a and the second control command Iq*_b for output based on the result of the output priority determination.

Figure 12:
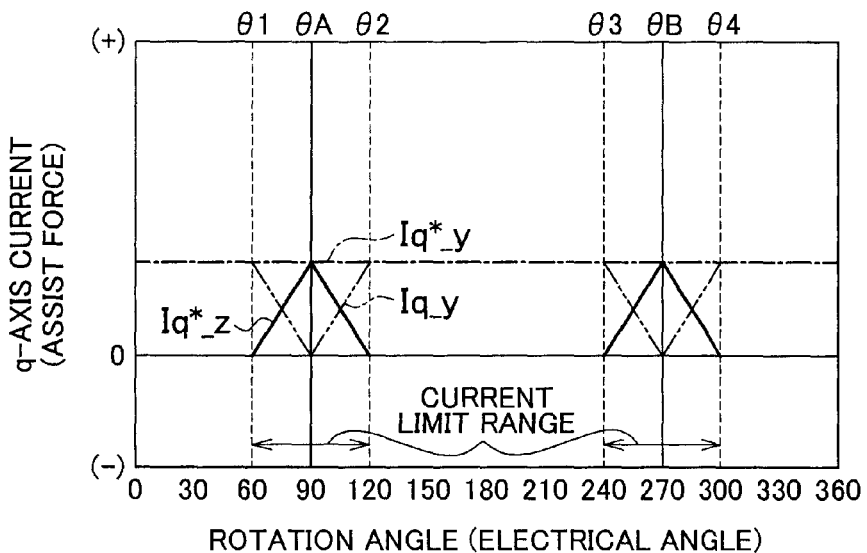
FIG. 12 is a chart that shows an aspect of the continuous control after the occurrence of the energization failure according to the second embodiment.

More particularly, the correction command operation section 55 of the present embodiment computes, as shown in FIG. 12, during the two-phase drive, the correction command Iq*_z that compensates for the restriction of the power supply that arises through the execution of the current limit in the energized phases of the system where the energization failure has occurred, that is, the decrease in the complementary current (Iq_y) within the current limit range (θ1-θ2 and θ3-θ4).

In FIG. 12, the waveform of the alternate long and short dashed line shows the complementary command Iq*_y, and the waveform of the alternate long and two short dashes line that has troughs within the current limit range shows the complementary current Iq_y. The correction command Iq*_z is shown with the waveform of the solid line that has crests within the current limit range.

Figure 13:
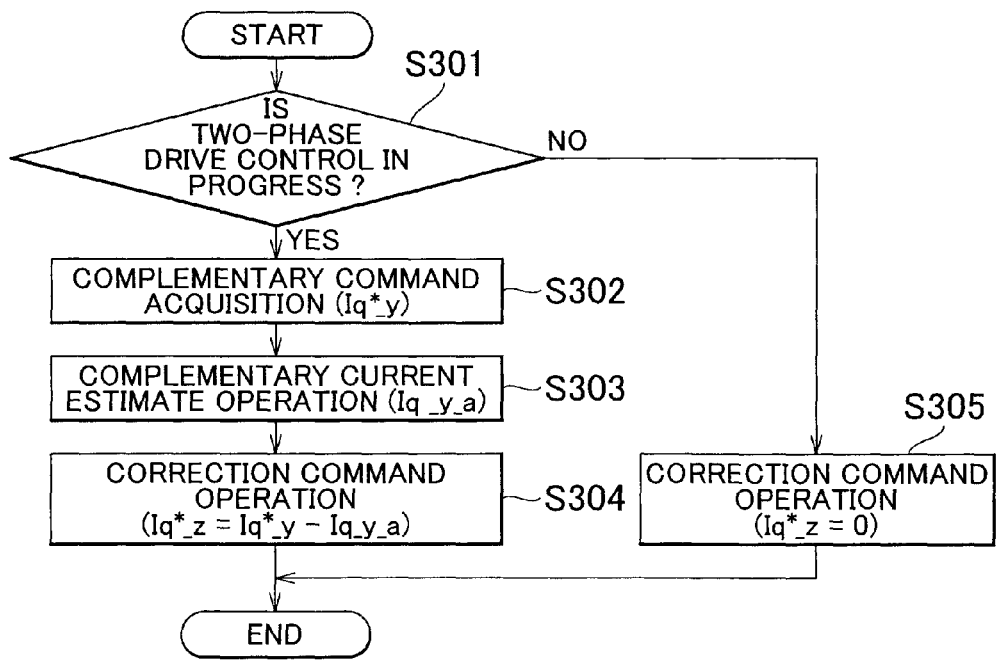
FIG. 13 is a flowchart that shows operating procedures of a correction command operation according to the second embodiment.

Specifically, as shown in the flowchart of FIG. 13, the correction command operation section 55 of the present embodiment first determines whether the two-phase drive control after the occurrence of the energization failure is in progress or not (Step 301). When it is determined that the two-phase drive control is in progress (Step 301: YES), the correction command operation section 55 acquires the complementary command Iq*_y that is output by the split control section 54 (Step 302). The correction command operation section 55 next computes an estimate value (Iq_y_a) of the complementary current Iq_y that generated through the execution of the two-phase drive control based on the complementary command Iq*_y (complementary current estimate operation, Step 303). The correction command operation section 55 of the present embodiment computes, as the correction command Iq*_z, the value that subtracts the complementary current estimate value Iq_y_a from the complementary command Iq*_y(Iq*_z=Iq*_y−Iq_y_a, Step 304).

The execution determination of the two-phase drive control in Step 301 is performed based on the anomaly detection signal Str. The operation of the complementary current estimate value Iq_y_a in Step 303 is performed by computing the current command value of the phases based on the complementary command Iq*_y and, on the assumption that the current limit is executed, by performing the d/q conversion of the phase current command values after the current limit. When it is determined that the two-phase drive control is not in progress in Step 301 (Step 301: NO), zero ("0") as the correction command Iq*_z is computed (Iq*_z=0, Step 305).

That is, the control signal output section 51 of the present embodiment corrects the priority command Iq*_x to the value that exceeds the upper limit of the priority current Iq_x (see FIG. 10, Iq_max/2) that is set for the normal system that gives high priority to the control signal output when the power supply is restricted through the execution of the current limit in the energized phases of the system where the energization failure has occurred during the two-phase drive. The control signal output section 51 is configured to output the control signal based on the priority command Iq*_x' after the correction to the normal system that gives high priority to the control signal output and therefore to compensate for the restriction of the power supply that arises through the execution of the current limit in the system where the energization failure has occurred.

As described above, according to the present embodiment, when the two-phase drive control is executed in the system where the energization failure has occurred, the torque ripple that arises through the limitation of the phase current can be cancelled out with the torque of the normal system. Therefore, the steering feel in the continuous control after the occurrence of the energization failure can be improved more effectively.

Hereinafter, a third embodiment that embodies the present invention will be described with reference to the attached drawings. For convenience of description, the same configuration as the first embodiment and the second embodiment is given with the same reference numeral and symbol, and the descriptions are not repeated.

Figure 14:
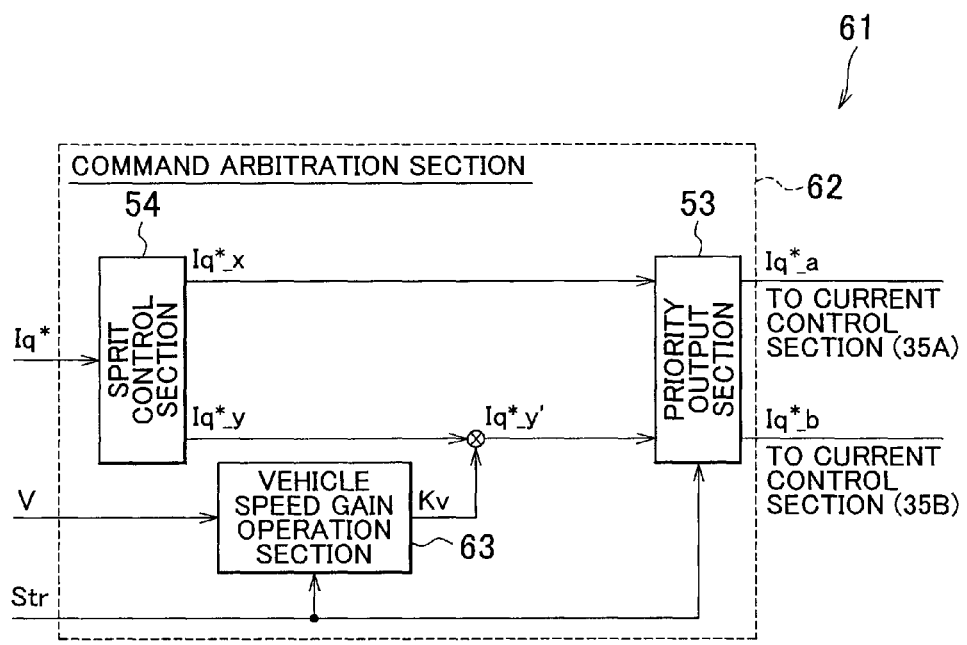
FIG. 14 is a control block diagram that illustrates a schematic configuration of a main component (a command arbitration section) according to the second embodiment.

As shown in FIG. 14, the present embodiment also differs from the first embodiment and the second embodiment in the configuration of the command arbitration section 62 (37, 52) that is provided in the control signal output section 61 (31, 51) (see FIG. 4 and FIG. 11).

Particularly, as shown in FIG. 14, the command arbitration section 62 of the present embodiment is provided with the priority output section 53 and the split control section 54, as well as a vehicle speed gain operation section 63 that computes vehicle speed gain Kv. The priority output section 53 receives the priority command $Iq^*\_x$ that is output by the split control section 54 and the complementary command $Iq^*\_y'$ that has been corrected by multiplying by the vehicle speed gain Kv that is output by the vehicle speed gain operation section 63.

More particularly, the vehicle speed gain operation section 63 of the present embodiment changes the output vehicle speed gain Kv depending on the vehicle speed V after the occurrence of the energization failure when the two-phase drive control is executed in the system where the energization failure has occurred.

Figure 15:
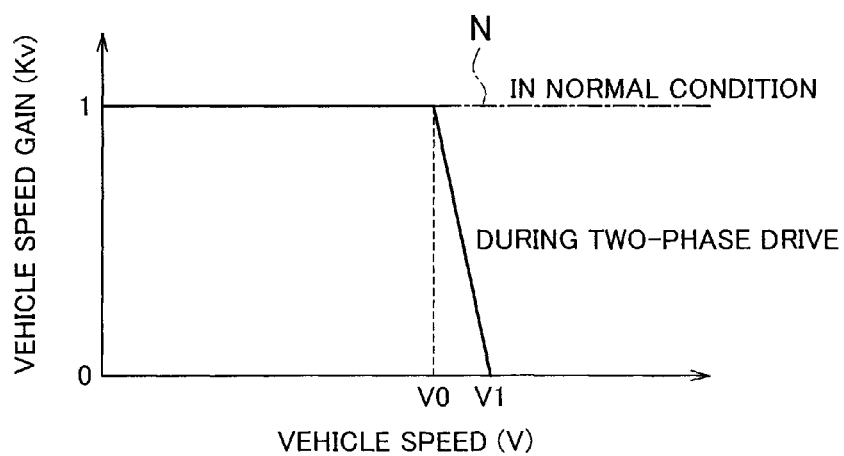
FIG. 15 is a chart that shows an aspect of a vehicle speed gain operation responsive to the vehicle speed in the electric power steering system according to a third embodiment of the present invention.

Specifically, as shown in FIG. 15, the vehicle speed gain operation section 63 outputs "1" when the vehicle speed V is equal to or less than the specified speed V0 and "0" when the vehicle speed V is equal to or greater than the specified speed V1. In the region between the vehicle speed V0 and the vehicle speed V1, the vehicle speed gain Kv is set to be smaller as the vehicle speed is faster. In the normal condition where the energization failure does not occur, the vehicle speed gain operation section 63 is configured to output "1" as the vehicle speed gain Kv independently of the vehicle speed (in FIG. 15, the waveform N shown with an alternate long and short dashed line).

That is, in a low vehicle speed region where the demand for assist is high, in most cases, better steering feel can be achieved by preventing the power reduction through the use of the torque in the system where the energization failure has occurs even after the consideration of the torque ripple that arises through the execution of the two-phase drive control. On the other hand, the presence of the torque ripple creates difficulty in fine steering angle adjustment. As a result, in a high vehicle speed region where change in the steering angle has large effect on the vehicle attitude, the steering feel may decrease.

In consideration of the above, the command arbitration section 62 of the present embodiment corrects the value of the complementary command $Iq^*\_y$ to "0" in the high vehicle speed region equal to or greater than the specified speed V1 where the effect of the torque ripple that arises through the execution of such the two-phase drive control becomes obvious. The favorable steering feel can be achieved even in the high vehicle speed region by stopping the output of the control signal to the system where the energization failure has occurred, that is, by stopping the execution of the two-phase drive control, and by facilitating the fine steering angle adjustment.

As the present embodiment described above, the steering feel can be improved, depending on the vehicle speed V, by changing the two-phase drive control in the system where the energization failure has occurred, that is, by increasing or decreasing the power supply in which the two phases other than the energization failure occurring phase are used as the energized phases, in a wide vehicle speed region.

The embodiments described above can be modified as follows.

Although the embodiments described above embodies the present invention in the so-called column type EPS 1, the present invention may be applied to so-called pinion type or rack assist type EPS.

In the embodiments described above, the EPS actuator 10 utilizes the motor 12 that has the stator 22 and the rotor 24 that are shared by the dual-system motor coils 21A and 21B as the drive source. However, the present invention is not limited to this and may be embodied in the configuration such that each motor coil has a separate stator or a separate rotor. In addition, the configuration that utilizes two motors as the drive sources may be used.

The motor coils in each system may have the configuration such that the phases are shifted to each other. •In the embodiments described above, the ECU 11 has two driver circuits 26A and 26B that are independently disposed in connection with the motor coils 21A and 21B. However, the number of the driver circuit in the systems is not particularly limited for the configuration such that each system has the driver circuit for backup.

In the embodiments described above, as an aspect of the two-phase drive control, the phase current, which varies in the secant curve pattern or the cosecant curve pattern by setting the specified rotation angles $\theta A$ and $\theta B$ corresponding to the energization failure occurring phase as an asymptote, is flown. However, the present invention is not limited to this, and the aspect of the two-phase drive control may be modified so that two-phase sinusoidal energization where the phases of each energized phase are shifted by 180° (simple two-phase drive) is performed. That is, the steering feel can be improved by preventing the power reduction through the use of the torque in the system where the energization failure has occurs. In the low vehicle speed region where the demand for assist is high, particularly, remarkable effect can be achieved. However, if the torque ripple that arises through the execution of the two-phase drive control is considered, it is preferable to have the energization waveform as described in the embodiments.

In the embodiments described above, the upper limit of the prior current $Iq\_x$ is set to be "½" of the command maximum vale $Iq\_max$ corresponding to the maximum target assist force; however, the upper limit is not limited to this and may be set to any value according to the specification of the motor coil.

In the embodiments described above, even in the normal condition where the energization failure does not occur, the difference between the basic command $Iq^*$ and the priority command $Iq^*\_x$, that is, the excess of the upper limit that is set as the priority command $Iq^*\_x$ is considered to be the complementary command $Iq^*\_y$: ($Iq^*\_y=Iq^*-Iq^*\_x$). By dividing the priority command $Iq^*\_x$ into the first control command $Iq^*\_a$ that is used for generation of the control signal $Smc\_a$ that is output to the driver circuit 26A in the first system for output, high priority is given to the output of the control signal $Smc\_a$ corresponding to the first system. However, the present invention is not limited to this, and the division into the system in the normal condition is not particularly limited. For example, the present invention may employ the configuration that is used in the generation of the control signals $Smc\_a$ and $Smc\_b$ of the systems.

In the second embodiment described above, the estimate value ($Iq\_y\_a$) of the complementary current $Iq\_y$ that is generated through the execution of the two-phase drive control based on the complementary command $Iq^*\_y$ is computed, and the value that subtracts the complementary current estimate value $Iq\_y\_a$ from the complementary command $Iq^*\_y$ is computed as the correction command $Iq^*\_z$: ($Iq^*\_z=Iq^*\_y-Iq\_y\_a$). However, the operation method of the correction command $Iq^*\_z$ is not limited to this and may use the detection value of the complementary current Iq_y (q-axis current value after the d/q conversion of the phase current values) in the place of the complementary current estimate value Iq_y_a.

In the third embodiment described above, the output of the control signal to the system where the energization failure has occurred is stopped in the high vehicle speed region equal to or greater than the specified speed V1 where the effect of the torque ripple that arises through the execution of the two-phase drive control becomes obvious. However, the present invention is not limited to this and may have the configuration in which the power supply is reduced through the execution of the two-phase drive control in the system where the energization failure has occurred as the vehicle speed V is increased. Although the present invention has such the configuration, the torque ripple can be reduced and the fine steering can be facilitated in the high vehicle speed region, while the assist force that is required in the low vehicle speed region is secured. When the present invention is embodied, the region between the speed V0 and the speed V1 (intermediate region) as shown in FIG. 15 may be set widely, for example.

Also, the configuration of the second embodiment and the configuration of the third embodiment may be combined. Accordingly, the steering feel can be improved more effectively. Next, the technical idea that can be understood from the about embodiments will be described.

It is a motor controller that includes: a command section that generates a basic command for power supply; a control signal output section that outputs independent dual-system control signals based on the basic command; and independent dual-system driver circuits that output three-phase drive electric power to connected motor coils based on the entered control signals, and it is characterized in that: a detection section that can detect for each phase the occurrence of the energization failure in power supply paths of the systems in connection with the motor coils is provided; the control signal output section gives high priority to the output of the control signal to one system when the occurrence of the energization failure is detected in another one of the systems; and when the energization failure occurring phase is only one phase and the value of the basic command exceeds the upper limit that is set to the normal system that gives high priority to the control signal output, the control signal output section outputs the control signal to the driver circuit in the system where the energization failure has occurred in order to supply electric power which corresponds to the excess of the upper limit and in which the two phases other than the energization failure occurring phase are used as the energized phases.

The invention claimed is:

1. An electric power steering system comprising:
a steering force assist device configured to give an assist force to a steering system based on a magnetomotive force generated by dual-system motor coils, the dual-system motor coils being provided independently; and
a controller configured to control an operation of the steering force assist device through an electric power supplied to the dual-system motor coils, the controller including:
an assist control section being configured to generate a basic command for supplying the three-phase electric power to the dual-system motor coils in order to generate a motor torque corresponding to the assist force,
a control signal output section being configured to output independent dual-system control signals based on the basic command,
independent dual-system driver circuits being configured to supply the three-phase electric power to the dual-system motor coils based on the independent-dual system control signals; and
an anomaly detection section configured to detect, for each phase of the three-phase electric power, an occurrence of an energization failure in respective power supply paths of a first system and a second system of the dual-system motor coils, wherein:
when the occurrence of the energization failure is detected in the first system, the control signal output section gives a higher priority to a control signal output to the second system,
when the occurrence of the energization failure is detected in the second system, the control signal output section gives the higher priority to a control signal output to the first system, and
when the occurrence of the energization failure is detected in an energization failure occurring phase that is only one phase of the three-phase electric power and a value of the basic command exceeds an upper limit, the control signal output section gives the higher priority to a control signal output to the dual-system driver circuits in order to supply electric power, corresponding to an excess of the upper limit, by the two phases of the three-phase electric power other than the energization failure occurring phase, and
the upper limit being set to a normal system that gives high priority to the output of the control signal.

2. The electric power steering system according to claim 1, wherein the control signal output section is further configured to output the independent dual-system control signals to an energized one of the phases of the first or second system where the energization failure occurs in order to flow a phase current, the phase current varying in a secant curve pattern or a cosecant curve pattern by setting specified rotation angles corresponding to the energization failure occurring phase as an asymptote.

3. The electric power steering system according to claim 2, wherein the control signal output section is further configured to:
limit the phase current in order to avoid an occurrence of excessive flow of electric current, and
output the independent dual-system control signals to supply the electric power beyond the upper limit, when the power supply is restricted through a phase current limit in the normal system where the energization failure has occurred, in the normal system that gives higher priority to the output of the independent dual-system control signals, in order to compensate for restriction of the electric power supply in the first or second system where the energization failure has occurred.

4. The electric power steering system according to claim 1, wherein the upper limit is set to be ½ a maximum value of the basic command for the electric power supply.

5. The electric power steering system according to claim 1, wherein the control signal output section is further configured to decrease the electric power supply depending on a vehicle speed.

6. The electric power steering system according to claim 5, wherein the control signal output section is further configured to decrease the electric power supply as the vehicle speed increases.

7. The electric power steering system according to claim 1, wherein the control signal output section is further configured to control the output of the independent dual-system control signals to the first or second system to be zero in the first or second system where the energization failure has occurred, when vehicle speed is equal to or greater than a specified value.

8. The electric power steering system according to claim 1, wherein the steering force assist device is configured to utilize a motor having a stator and a rotor as a drive source, the stator and the rotor being shared by the dual-system motor coils.

* * * * *